UNITED STATES PATENT OFFICE.

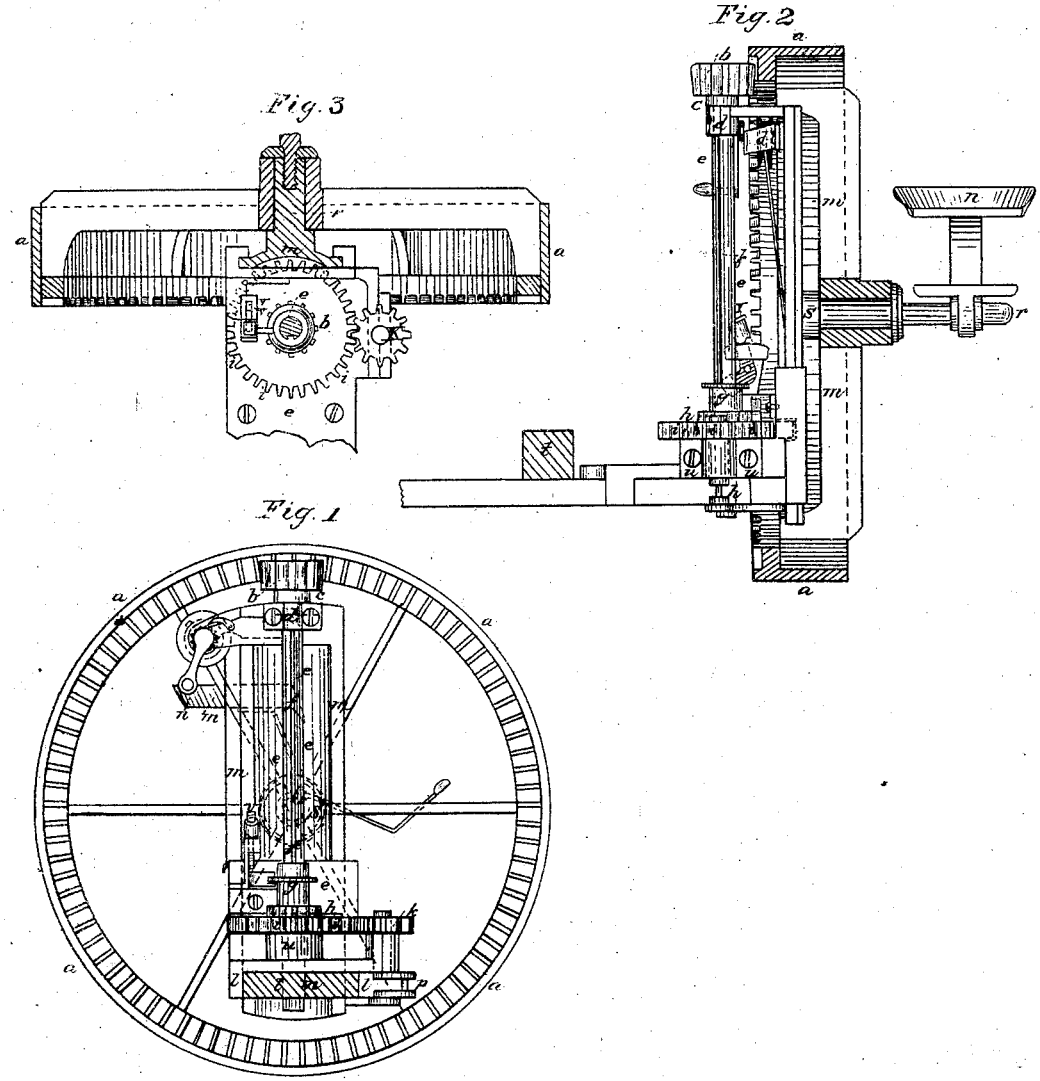

SAMUEL JOHNSTON, OF BUFFALO, NEW YORK, ASSIGNOR TO HIMSELF AND RUFUS L. HOWARD, OF SAME PLACE.

IMPROVEMENT IN HARVESTERS.

Specification forming part of Letters Patent No. 46,190, dated January 31, 1865.

*To all whom it may concern:*

Be it known that I, SAMUEL JOHNSTON, of Buffalo, in the county of Erie and State of New York, have invented a new and Improved Harvester, which I call "The Great Western;" and I do hereby declare that the following is a full, and exact description thereof, reference being had to the accompanying drawings, and to the letters of reference marked thereon.

The nature of my invention consists in making a harvester called "The Great Western," which will cut a wide swath and still be of easy draft, and the height of the cut can be readily adjusted so as to cut high in stout grain or low where the grain is short or lodged without change of gear or changing the relative position of gear and cutters. The finger-beam of the harvester is located opposite or nearly opposite to the tread of the main driving-wheel, and this location secures a more perfect balance of the machine and more easy application of a platform, and greater facility in raking grain from the platform. The gearing is also located within the periphery of the main wheel, and both finger-beam and gearing so located may be raised and lowered together to any desired height and still preserve the same relation to each other and the free working of the machine.

To enable others skilled in the art to make and use my invention, I will proceed to describe its construction and operation.

I make my harvester with one large ground and operating wheel, about four feet and one-half in diameter, and the platform is attached in the usual manner to the cutter-beam, with a bearing-wheel attached on the outer side, or next to the standing grain, in the usual manner. The ground-wheel has cogs on the side next to the outer rim of the wheel, and on the main shaft, $r$, I arrange a seat on the outside or left of the main ground-wheel $a$. This main shaft extends out from the outside of the wheel sufficiently far to allow of arranging a convenient seat thereon. The ground-wheel revolves on said main shafts.

Inside of the main wheel a standard about four feet long and ten inches wide, with a concave surface upon the inside, is placed, to which the main shaft is firmly keyed at the center thereof, so that about three inches space is left between the standard and the inside of the main wheel at each end of said standard. This standard is made of cast-iron, and at the upper end there is securely fastened on the inside a bearing, letter $d$, to support the upper end of the upright shaft $e\ e\ e$, which has a slot or groove, $f$, cut therein the whole length thereof. This upright shaft is about three feet and a half long, and on the upper end is attached a bevel-pinion, which meshes into the large or ground wheel, and the shaft extends downward parallel with the said standard and through a bearing in the main plate, lettered $l$.

Attached to the shaft directly above the bearing in the main plate is a pinion, into which a small pinion, lettered $k$, meshes, which drives the crank $p$, to which the pitman is attached. The large pinion or cog-wheel, into which the small pinion $k$ meshes, is lettered $i$. Above this large pinion, and resting upon it, or it may be part of it, is a small pinion for the purpose of operating an automatic rake, whereon the same is used, and which may be readily attached to my reaper; and immediately above this small pinion are a clutch and lever attached, respectively lettered $g$ and $v$, for the purpose of throwing the same in and out of gear.

The main plate or casting $l\ l$ has a recess upon the under side, in which the beam to which the cutters are attached is securely fastened. It is in a letter L form, the inner end extending up, and slides up and down the standard by means of a groove or grooves in that part attached to said standard. The grooves are on each side of the upright part, and in these grooves the said main plate slides, and by means thereof the same is raised and lowered and the height of the cut of the grain is regulated.

At the top of the upright standard I attach a lever and roller, with a cord or chain attached to the same and to the main plate, to which the cutter-bar is fastened, and by means of this arrangement (see letter $o$) I raise and lower the main plate and hold the same in position by means of a dog, or secured by a bolt or key in the standard. I attach a pole to the cutter-beam, and when the main plate is raised or lowered the cutters and all the gearing are raised and the operation of the machine continues.

Having thus described my invention, I claim as follows, viz:

1. Constructing a harvesting-machine, which I call "The Great Western," with the finger-beam located opposite or nearly opposite to the tread and the gearing located mainly within the periphery of the driving-wheel, and with the finger-beam and gearing so arranged that both can be raised and lowered together to any desired height and still preserve the same relation to each other and the free working of the same, all constructed and arranged substantially as set forth, and for the purposes described.

2. The standard $m$ $m$, located within the periphery of the driving-wheel, the main plate $l$ $l$, and the perpendicular line-shaft $e$ $e$, for supporting the finger-beam and gearing and allowing them to be adjusted to the required height, arranged substantially as described, and for the purposes set forth.

3. The perpendicular grooved line-shaft, in combination with the feathered clutch, arranged and constructed as described, and for the purposes herein set forth.

Dated November 3, 1864.

SAMUEL JOHNSTON.

Witnesses:
GIB. F. HOWARD,
GEO. H. HUGHSON.